United States Patent [19]

Ohara et al.

[11] 3,836,723

[45] Sept. 17, 1974

[54] ANSWERING SYSTEM FOR PBXS

[75] Inventors: Sigeo Ohara; Fumio Yoshimura; Kazuhiko Sugai, all of Tokyo, Japan

[73] Assignee: Meisei Electric Co., Ltd., Tokyo, Japan

[22] Filed: Sept. 14, 1972

[21] Appl. No.: 289,163

Related U.S. Application Data

[63] Continuation-in-part of Ser. No. 12,239, Feb. 18, 1970, abandoned.

[30] Foreign Application Priority Data

Feb. 26, 1969 Japan ............................... 44-14480

[52] U.S. Cl. ....... 179/18 AD, 179/18 AH, 179/18 EB

[51] Int. Cl. ........................................... H04q 3/62

[58] Field of Search ....... 179/18 AD, 18 EA, 18 BF, 179/18 BG, 27 CA, 27 FH, 18 E, 18 EB, 18 B, 18 BH, 18 AH

[56] References Cited

UNITED STATES PATENTS

| | | | |
|---|---|---|---|
| 3,102,930 | 9/1963 | Anderson et al. .............. | 179/18 AD |
| 3,190,965 | 6/1965 | Zarouni .......................... | 179/18 BH |
| 3,210,475 | 10/1965 | Breen et al. ..................... | 179/18 BB |
| 3,215,783 | 11/1965 | Watts ............................. | 179/18 BB |
| 3,253,089 | 5/1966 | Breen et al. ..................... | 179/27 FH |
| 3,327,064 | 6/1967 | Braund et al. .................... | 179/27 CA |
| 3,355,555 | 11/1967 | Thelemaque ...................... | 179/18 BG |
| 3,363,062 | 1/1968 | Hohmann, Jr. et al. ........ | 179/18 AD |
| 3,459,897 | 8/1969 | Teresaka ........................ | 179/18 AD |

*Primary Examiner*—Thomas W. Brown
*Attorney, Agent, or Firm*—Toren, McGeady and Stanger

[57] ABSTRACT

In a PABX a subscriber responds to an incoming call from a central office trunk by going off-hook so a marker can establish a connection to a register through an idle intra-office trunk. The register produces a dial tone. The subscriber then dials a predetermined digit, to which the register responds by engaging the marker which seizes the one central office trunk on which the incoming call appears and changes the route from the subscriber to that trunk. Instead of dialing the subscriber may press a key that affects the register as if the predetermined digit had been dialed. When all registers are busy the marker bypasses the register and responds directly to change the route.

4 Claims, 8 Drawing Figures

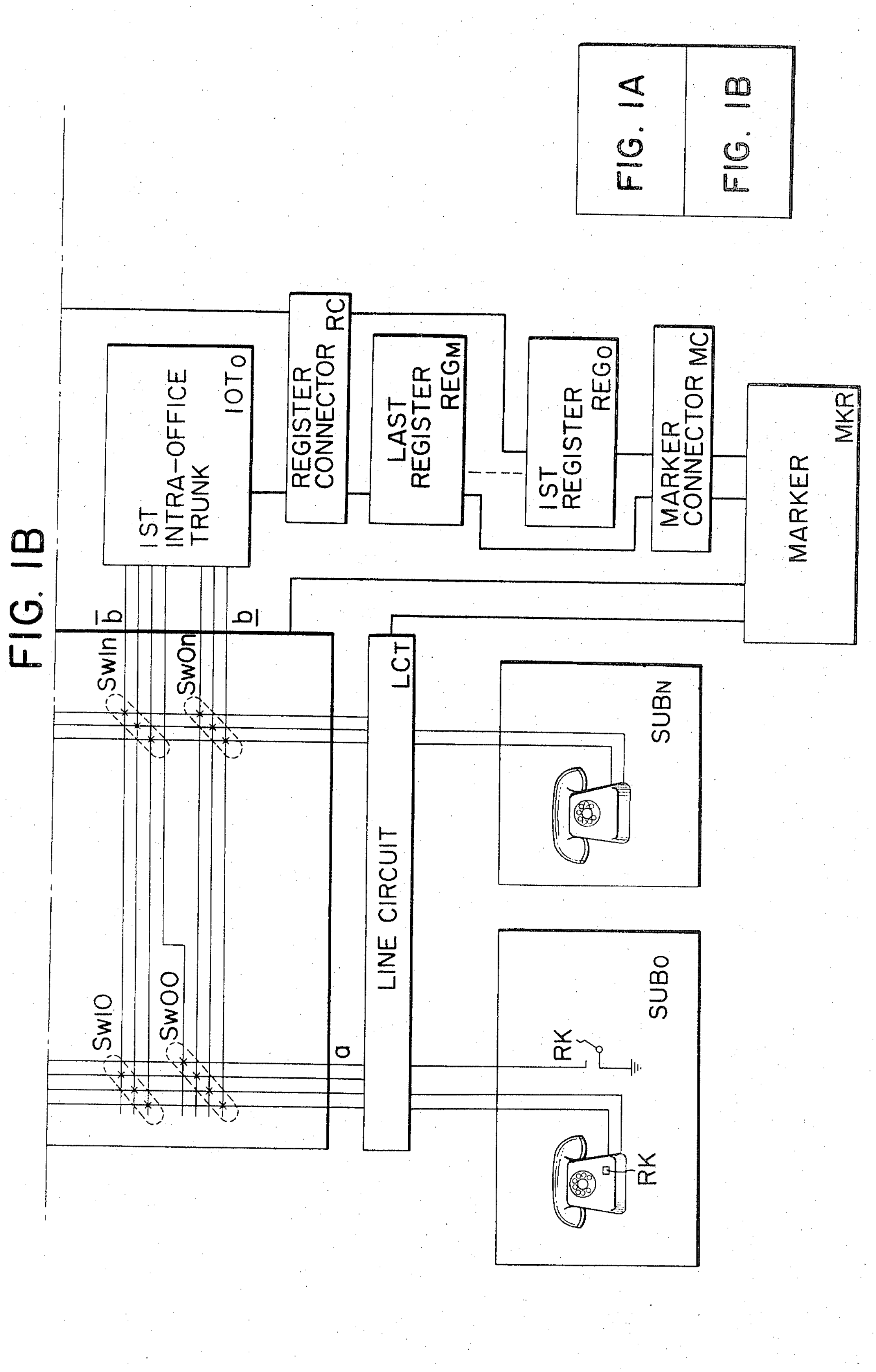
FIG. IB

ANSWERING SYSTEM FOR PBXS

REFERENCE TO CO-PENDING APPLICATION

This is a continuation-in-part of our co-pending application Ser. No. 12,239 filed Feb. 18, 1970 now abandoned, and assigned to the same assignee as the present application. The content of that application is hereby made a part of this application as if fully recited herein.

BACKGROUND OF THE INVENTION

This invention relates to telephone switching systems for private branch exchanges (PBXs), and particularly to private automatic branch exchange (PABX) switching systems.

In some PABXs an incoming call on a trunk from the central office is answered by using a so-called dial-answering method. In such systems, when an incoming call arrives on the central office trunk, the subscriber responds and hears a dial tone. He then dials a predetermined number such as "8," and a register responding to the dialed number causes a marker to connect the subscriber's set to the central office trunk carrying the incoming call. This operation is the same as that which is carried out during ordinary off-hook dialing. The dialed number for answering an incoming call from the central office can easily be recognized by the register, so that the system can accomodate this method of answering an incoming call.

Other PABXs utilize a key-answering system. In such systems, an incoming call on a trunk from a central office is answered by the subscriber's operating a key provided specifically for this purpose. When the key is pushed, and the handset raised, the signal generated by the key is detected by the marker. The marker then establishes the connection to the trunk.

An object of the present invention is generally to improve PABXs.

Responding to an incoming call by dialing is somewhat complicated. Stations having frequent occasion to deal with incoming calls, such as a reception desk at an office, are encumbered by the need to dial.

On the other hand, responding by use of a key is simpler than dialing. However, this has the disadvantage that an off-hook operation must be performed while pressing the key in order to distinguish this operation from the genral off-hook operation. Also, circuits utilizing keys are often complicated.

Another object of the invention is to avoid the disadvantages of key operations.

Still another object of the invention is to offer the responding station the opportunity to answer an incoming call by a key, and still make the circuits as simple as possible.

SUMMARY OF THE INVENTION

According to a feature of the invention, these and other objects are obtained in a PABX by allowing dialing of a predetermined number to actuate a register that causes a marker to connect the station to a trunk, and by connecting a key so that its operation causes an identical operation in the register.

According to another feature of the invention wyen all registers are busy and cannot be seized, means are provided to bypass the register and connect the answering station to a trunk carrying the incoming call.

By virtue of the invention, the private automatic branch exchange allows a subscriber to choose to answer an incoming call on a central office trunk, either by dialing a predetermined number, or operating an answering key. The same apparatus within the PABX performs the function of connecting the subscriber to the trunk regardless of whether the subscriber has dialed or operated the key. Thus it is unnecessary to provide separate apparatuses to perform these functions. Moreover, whether the subscriber dials the predetermined number to answer an incoming call from a central office, or whether he presses the key, either of these need be done only after the handset is raised and the dial tone is heard. Thus, the operation corresponds to that used for ordinary off-hook calling when a dial tone is heard.

The present invention most specifically involves the registers, which include most of the circuitry for carrying out the operation, and the circuits interconnecting the registers with the telephone set, as well as the marker controlling the circuits.

By virtue of the invention, an incoming call from the central office can be answered either by dialing the predetermined number or with the key on the basis of the subscriber's choice. However, the system is not limited to answering incoming calls from a central office but is capable of answering calls from other stations in the PABX or exclusive lines extended out of the PABX, and so forth.

According to another feature of the invention when the key is pressed after a dial tone is obtained, as is the case for making a call, means responsive to the key seize the same register utilized in ordinary off-hook calling.

According to another feature of the invention, the telephone is connected with the register through connecting means, such as the type involving cross point switches, links, juctors, etc. When the subscriber operates the key to answer the call after hearing the dial tone, the key signal passes to the register through the connecting means.

A yet further feature of the present invention resides in that there is provided no special route (cleared channel) for transmitting the answering signal which is made by operating the key to answer the incoming call, that is, the signal which informs that the key has been operated. When a station makes an ordinary originating call (in other words, when a station does not make an answer to the incoming call), the station is connected to an intra-office trunk which is then connected to a register to make a route, through which the incoming call-answering signal generated by the operation of the key is transmitted from the station to the intra-office trunk and then to the register.

According to another feature of the invention, the register responds to the key signal in the same way that it responds to a dial signal.

According to another feature of the invention, when the telephone can seize none of registers, it receives a prediction alarm tone by using the same signal as the busy tone. And then, the telephone of the subscriber is automatically connected with the central office trunk generating the incoming call from the central office.

According to another feature of the invention, when the calling telephone cannot seize any register, a marker automatically connects the calling telephone to the central office trunk carrying the incoming call from the central office.

Because of the invention, after a dial tone connection is completed, namely after the subscriber's telephone calls, the switching circuit operates and completes the connection to the register, and it becomes possible to dial after hearing the dial tone so that the call can be answered either with a dial or an answering key. This allows sufficient time for answering and therefore offers little chance for misoperation. A simple system, easily used, is thus possible.

An advantage of the invention resides in the fact that even when the register cannot be seized, the incoming call from the central office can be answered without the register, using the marker only, by going off-hook without complicated special operation of the dial and without waiting until the register is disengaged. This allows an increase in traffic and improves the service.

According to another feature of the invention, the master telephone is equipped with key service using unoccupied contacts of the switch in the subscriber's channel. This allows the invention to be used in a simple and effective manner.

According to another feature of the present invention, the system is composed of solid state electronic parts.

These and other features of the invention are pointed out in the claims. Other objects and advantages of the invention will become evident from the following detailed description when read in light of the accompanying drawings.

DESCRIPTION OF PREFERRED EMBODIMENTS

Figure 1A:
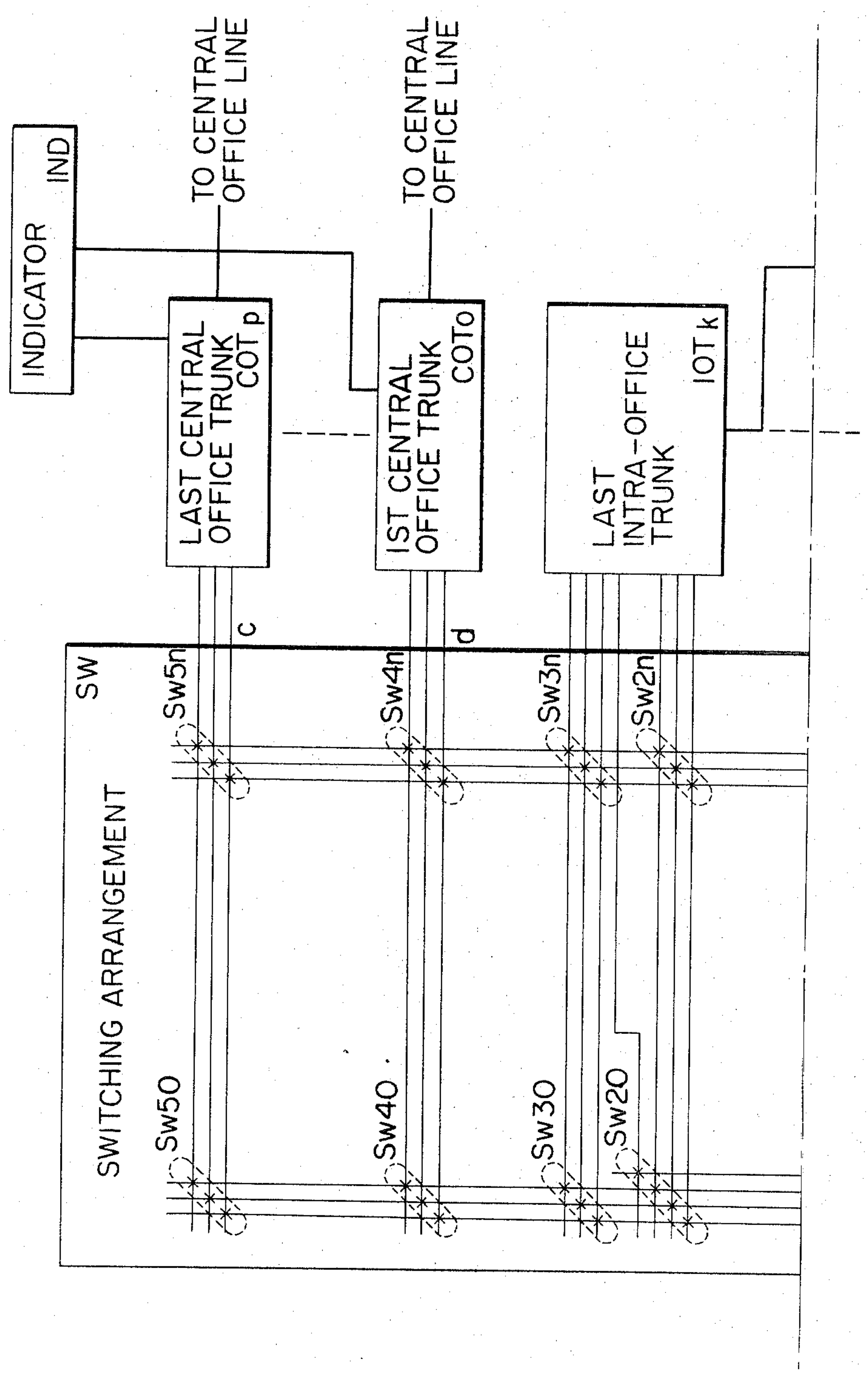
FIG. 1 is a brock diagram illustrating a PABX embodying features of the invention.

FIG. 1 illustrates an example of the diagram of a private automatic branch exchange (PABX) of a system which is called the register postposition system, wherein there are provided $(N + 1)$ subscriber's telephones from $SUB_O$ to $SUB_N$, (P + 1) central office trunks from O to P, $(K + 1)$ intra-office trunks from O to K, $(M + 1)$ registers from O to M, and further a marker (MKR), an indicator (IND) for indicating which of the central office trunks is in use, a switching arrangement (SW), and a subscriber's circuit (line circuit) LCT, and yet further marker connectors (MC) for connecting the registers with the marker and resister connectors for connecting the intra-office trunks with the registers.

The telephone $SUB_O$ has an operational key RK which is used when answering the incoming calls arrived on the central office trunks (the push button and its circuit contact are shown in the figure illustrating a telephone and at the right hand side of it respectively), while $SUB_N$ has not such an operational key. The subscriber's stations under invention may use two types of telephones, one of which has an operational electric key as well as a rotary dial which generates DC pulses, and the other of which has a rotary dial but no operational electric key. An answer can be made to the incoming call using either of telephones of these two types, but when a telephone of the first type having both the dial and the key is used to answer the incoming call, the operator may select the dial or the key arbitrarily on that occasion, and can answer the incoming call by operating only one of the dial and key which has been selected by his own decision. When the incoming call is answered by using a telephone of the second type having no key, an answer is made by operating the dial.

The station which makes considerably or extremely frequent answers to the incoming calls should be provided with a telephone having not only the rotary dial but also the key. (Such a telephone is often used by a station user who has the obligation to conduct the incoming calls somewhat exclusively in PABXS of a certain type, the stations of which conduct the incoming calls, playing a most active part among the station telephones, so that such a telephone is called the master telephone). The use of such a telephone makes it possible to conduct rapidly and economically the incoming calls. The station which makes a comparatively small number of answers to the incoming calls should be provided with a telephone having no key.

Further the switching arrangement SW of FIG. 1 has a set of four make-contacts $sw_{OO}$ which is closed when the subscriber's telephone $SUB_O$ is connected to the first intra-office trunk $IOT_O$ (the four contacts which are a set of contacts incorporated in a relay or crossbar switch are simultaneously closed, or simultaneously opened in an interlock relationship), a set of contacts $sw_{IO}$ which is closed in a manner similar to the above when the subscriber's telephone $SUB_O$ is connected to an intra-office trunk $IOT_O$, a set of contacts $sw_{On}$ which is closed when a subscriber's telephone $SUB_N$ is connected to the intra-office trunk $IOT_O$, a set of contacts $sw_{In}$ which is closed when a subscriber telephone $SUB_N$ is connected to the intra-office trunk $IOT_O$, sets of contacts $sw_{20}$ and $sw_{30}$ which are closed when the subscriber's telephone $SUB_O$ is connected to an intra-office trunk $IOT_K$, sets of contacts $sw_{2n}$ and $sw_{3n}$ which are closed when the subscriber's telephone $SUB_N$ is connected to the intra-office trunk $IOT_K$, a set of contacts $sw_{40}$ which is closed when the subscriber's telephone $SUB_O$ is connected to the central office trunk $COT_O$, a set of contacts $sw_{50}$ which iclosed when the subscriber's telephone $SUB_O$ is connected to a central office trunk $COT_P$, a set of contacts $sw_{4n}$ which is closed when the subscriber's telephone $SUB_N$ is connected to the central office trunk $COT_O$, and a set of contacts $sw_{5n}$ which is closed when the subscriber's telephone $SUB_N$ is connected to the central office trunk $COT_P$.

And the switching arrangement is also said to be the channel switch, because when a connection process for an intra-office intercommunication between a subscriber and another subscriber, or external communication between a subscriber and a subscriber on the outside of the PABX has been completed to allow the communication to be kept up, some sets of contacts among the sets of contacts $sw_{00}, \ldots, sw_{5n}$ are closed to open up a channel within the switching arrangement through which the communication is carried out.

The telephone ($SUB_O$ in the figure) having an operational electric key for answering the incoming calls arrived on the central office trunks has a lead extending from the contact of the key, and the lead is connected with one arm of each intra-office trunk by the make-contacts incorporated in sets of four make-contacts $sw_{00}$, $sw_{20}$ within the switching arrangement SW. Each of other sets of contacts is illustrated as a set of three make-contacts, the three make-contacts corresponding to the three leads by which each subscriber's telephone is connected with the intra-office trunks and the central office trunks. In other words, for the purpose of the transmitting the signal generated by the contact RK to the intra-office trunk, each of sets of contacts $sw_{00}$ and $sw_{20}$ has one contact more than the other sets of contacts have.

Two of the three leads which pass through each set of contacts $sw_{On}$, $sw_{50}$, etc., are a pair of communication leads, and the other lead is a control lead. The make-contacts of each set of contacts are provided to their respective leads. As shown in FIG. 1, the intra-office trunk has two connection arms extending to the switching arrangement SW, the arms being denoted by $\bar{b}$ and $b$ respectively.

It is one of the fundamental common features of the intra-office trunk that the intra-office trunk has the paired connection arms extending to the switching arrangement. However, it is a peculiarity of the present invention but not the fundamental common feature that one of the paired arms consists of a set of four leads.

According to FIG. 1, a brief explanation which is not the subject of the present invention, but will facilitate the understanding of the succeeding explanation of the present invention, is hereinafter given to "intra-office interconnection," that is, the interconnection between the intra-office subscriber's telephones, wherein the key RK is not used, $SUB_O$ is a calling subscriber and $SUB_N$ is a called subscriber.

When the calling subscriber $SUB_O$ goes hook-off, one of the idle IOTs is found out from among the $(K+1)$ intra-office trunks by the operation of the marker MRK through the line circuit LCT. If the found idle IOT is $IOT_O$, a set of contacts $sw_{00}$ is closed to connect $SUB_O$ to $IOT_O$, but $sw_{10}$ is not closed. Then the $IOT_O$ finds out an idle register from among the $(M+1)$ registers. If the found idle register is $REG_O$, the intra-office trunk $IOT_O$ is connected to the register $REG_O$ through the register connector RC. As a result, the calling subscriber $SUB_O$ is connected to $REG_O$, and a dial tone is set to the subscriber's telephone $SUB_O$ through $IOT_O$ and a set of contacts $sw_{00}$. Thus the dial tone connection has been completed, while the marker MKR is released out of the line circuit LCT. At this time, when the calling subscriber $SUB_O$ dials the subscriber's number of a subscriber $SUB_N$ to be called, the dial pulses corresponding to the dialed number are sent to the $REG_O$ through $sw_{00}$ and $IOT_O$, and then counted by the $REG_O$.

The numeral of the first figure of the intra-office subscriber's number is one of 2, 3 and 4. The number consists of two figures.

When the register $REG_O$ has counted the two digit number of the called subscriber which was dialed by the calling subscriber $SUB_O$, the $REG_O$ actuates the marker connector MC, and the marker MKR is seized by this circuit to give the counted result to the marker MRK. When the marker MKR recognises on the basis of the counted result that the called telephone or called subscriber is a $SUB_N$, it closes $sw_{1n}$ and send a test signal to the line circuit LCT corresponding to the $SUB_N$ in order to examine whether the $SUB_N$ is idle or busy. In this case, a set of contact $sw_{0n}$ is not closed. When the $SUB_N$ is recognized to be busy, a busy tone is sent from $IOT_O$ to the calling subscriber $SUB_O$, while when the $SUB_N$ is recognized to be idle, a ring tone is sent from $IOT_O$ to $SUB_N$ and a ring back tone is sent to $SUB_O$, so that if $SUB_N$ goes hook-off, a communication will be made possible.

The calling telephone is connected to IOT by the contact present at the intersection between said telephone and level $b$, while the called telephone is connected to IOT by the contact present at the intersection between said telephone and level $\bar{b}$. As explained above, the intra-office trunk IOT has one connection arm at either side, by which an intra-office telephone and another intra-office telephone are connected. When the calling subscriber in the intra-office interconnection is $SUB_O$, a set of contacts $sw_{00}$ is closed and one of its contacts to which the lead of the key RK extends is simultaneously closed. But the key is not used in the case of the intra-office interconnection, so that this lead and the contact incorporated in a set of contacts $sw_{00}$ to which said lead is connected have no function at this time.

A further explanation to the intra-office interconnection will not given, but for the purpose of the succeeding explanation of the answering to the incoming calls arrived on the central office which is the subject of the present invention, it is necessary to pay regard here to the fact that when an answer is made using the key RK, a connection for making the answer is formed among the RK contact, the contacts within sets of contacts $sw_{00}$, $sw_{20}$ which are connected to the contact RK and which are incorporated as members of the arm of the intra-office trunk IOT on the part of the calling subscriber, and the leads extending to IOT through said contacts, and to the fact that the leads extending from the contacts within sets of contacts $sw_{00}$, $sw_{20}$ are illustrated as if they are incorporated as members of the called part and introduced to IOT without being connected to the sets of contacts $sw_{1n}$, $sw_{3n}$ on the called party. FIG. 1 shows the four leads extending upward from the part denoted by (a) of $SUB_O$, the four leads ($b$) and three leads ($\bar{b}$) both extending to the left from IOT, and the three leads (c) extending to the left from COT, these three or four leads being grouped together to form routes. Therefore, the lead of key RK of the present invention takes a route stepping over from the calling route of IOT to the called route of IOT.

When there is an off-hook call at the subscriber $SUB_O$, and then the marker MKR detects that all the registers REG are busy, the subscriber station $SUB_O$ receives a busy tone or signal from the marker MKR through the line circuit LCT. At this time the subscriber station is connected only with the line circuit LCT and the marker MKR. The subscriber station $SUB_O$ is disconnected from the intra-office trunk IOT, the register connector RC, the register REG and a marker connector MC.

The early part of the above-mentioned process for the in intra-office interconnection using intra-office trunks is the same at that of the external connection process wherein a subscriber $SUB_0$ calls a telephone on the outside of the exchanger using a central office trunk, the early part continuing until $SUB_0$ has heard the dial tone. In order that the subscriber $SUB_0$ is connected to a telephone on the outside of the exchanger, the subscriber must begin by dialing to seize a central office trunk after he has recognized a dial tone. The register $REG_0$ counts the pulses generated by the dialing and actuates the marker, informing to the marker that a demand for a connection to the outside of the exchanger has been made. The marker performs an operation to change-over the connection of $SUB_0$ from the intra-office $IOT_0$ to an idle central office trunk among the $(P+1)$ central office trunks. If the thus-seized central office trunk is $COT_p$, for example, $IOT_0$ and $REG_0$ are released as a result, and $sw_{00}$ is also released, but $sw_{50}$ is closed instead, so that the subscriber $SUB_0$ is connected to the central office trunk $COT_P$ by the route ac. Thus the calling subscriber $SUB_0$ is connected through the central office trunk to a communication line extending to a central telephone exchange, receiving a dial tone from the central telephone office. After this, the connection process will proceed in the usual way with the dialing of a subscriber's number to be called.

By the way, in the present invention, when an answer is made to the incoming call arrived on the central office trunk from the central office exchange, the early part of the process for the above-mentioned intra-office interconnection, or for the external calling connection to the outside of the exchanger, that is, the process until the subscriber who went hook-off has heard a dial tone, proceeds first. In other words, whether the intra-office connection is performed, whether the calling connection to the outside of the exchanger is performed, whether the incoming call generated in the central office trunk is answered, is determined by what is the first figure of the number dialed by the subscriber who has recognized the dial tone. From this point of view the first figure of the number for the intra-office interconnection, the figure for seizing the central office trunk to make a calling connection to the outside of the exchanger, and the figure for seizing the trunk to answer the incoming call arrived on the said trunk are set so as not coincide with one another, thus the discrimination made by the register being not mistaken by the marker.

In case the key RK under the present invention is used for answering the central office incoming call, the only thing to do is to operate the key instead of the dialing of the predetermined number for answering the incoming call after the dial tone has been recognized.

In the following, the answering to the central office incoming call of the present invention is explained in detail according to FIG. 1.

When there is an incoming call from the central office on the central office trunk COT ex. $COT_0$, the subscriber at the station $SUB_0$ removes the switchhook to answer the call. He receives a dial tone after the marker sets up the connection $a$–$b$ as described above. He then dials a number such as "8" which is preset for answering an incoming call. Dialing of the predetermined number causes the register REG. ex. $REG_0$ to count and store it.

After the dialing operation, the register REG engages the marker MKR through the marker connector MC and transfers numerical information to the marker MKR. The marker MKR recognizes that the numerical information received represents a demand for setting up an answering connection to a central office trunk in response to an incoming call. The marker MKR seizes the one central office trunk $COT_0$, on which the incoming call from the central office appears, from a plurality of central office trunks. The marker MKR then changes the route $a$–$b$ within the switching circuit SW to a connection $a$–$d$ (between $a$ and $d$). This changes the previously existing connection between the subscriber station and the intra-office trunk IOT to a connection between the subscriber station and the particular central office trunk $COT_0$ carrying the incoming call.

When this changeover connection is confirmed, the intra-office trunk IOT, the register connector RC, the register REG, the marker connector MC, and the marker MKR are reset.

According to an aspect of the invention, the operation for answering an incoming call on a central office trunk is simplified by applying the telephone set of one or more of the subscriber stations, ex. $SUB_0$ and so forth, with respective pushbuttons for answering an incoming call on a central office trunk COT. This button eliminates the need for dialing the preset number "8."

When the answering button is used, the operation contrasts somewhat to the case where the preset number "8" is dialed and the register $REG_0$ identifies a demand for a connection to a central office trunk $COT_0$ carrying an incoming call. When the answering button is used, a grounded battery is connected to the register $REG_0$ through the intra-office trunk $IOT_0$ by means of a control lead which is separate from a communication lead. In response to the continuous ground potential, an element within the register $REG_0$ stores the same numerical information as it stores when the answering number "8" is dialed. Thus the answering button has the same effect upon the register $REG_0$ and the marker MKR as the dialing operation for the purpose of answering an incoming call.

A subscriber at the subscriber station $SUB_0$ may choose arbitrarily either to dial the answering number or press a button or key for the purpose of answering an incoming call over a central office trunk.

The apparatus according to the invention improves the service for incoming calls on a central office trunk by providing an answering connection even when all the registers $REG_0 - REG_M$ are busy. In that case, the subscriber station $SUB_0$ receives a busy tone as mentioned above as soon as the receiver is removed from the switchhook. If there is an incoming call on the central office trunk at this time one of the following two may occur.

The marker detects the existence of the incoming call, selects the central office trunk COT on which the incoming call is present, and immediately closes the route $a-d$ in the switching circuit SW to answer the incoming call. In the other process which may occur when all registers are busy, after the hand-set is removed from the switchhook of the subscriber station $SUB_0$, a timing circuit within the marker MKR supplies the subscriber station $SUB_0$ with a pre-announcing tone for a given time. This tone is followed by an answer to the central office trunk on which the incoming call is present.

For both of these cases, the marker MKR is disconnected from the line circuit LCT after conforming that the subscriber station has been connected with the particular central office trunk COT on which the incoming call was present.

Figure 2:
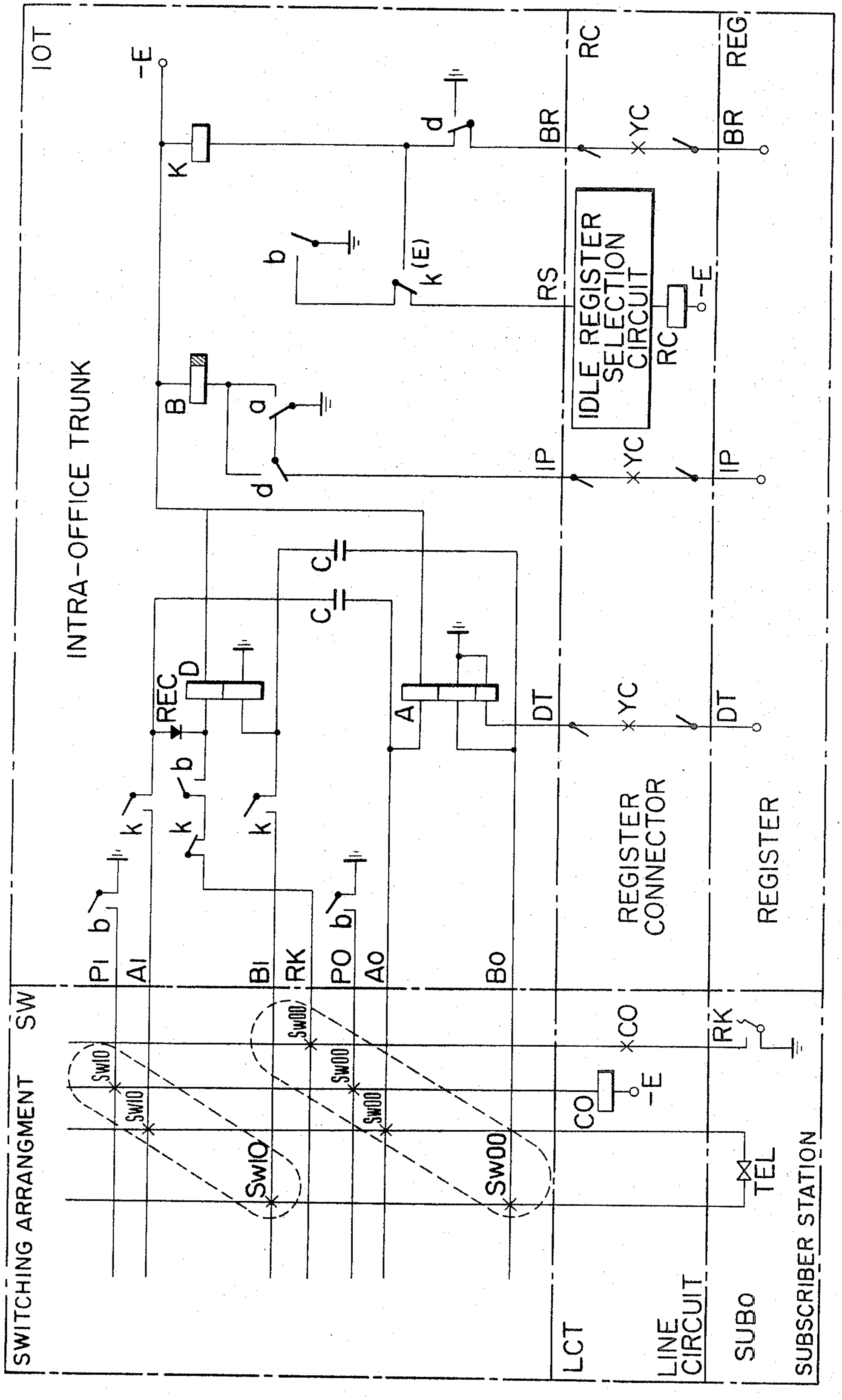
FIG. 2 is a detailed circuit diagram illustrating portions of the components of the system in FIG. 1.
Figure 3:
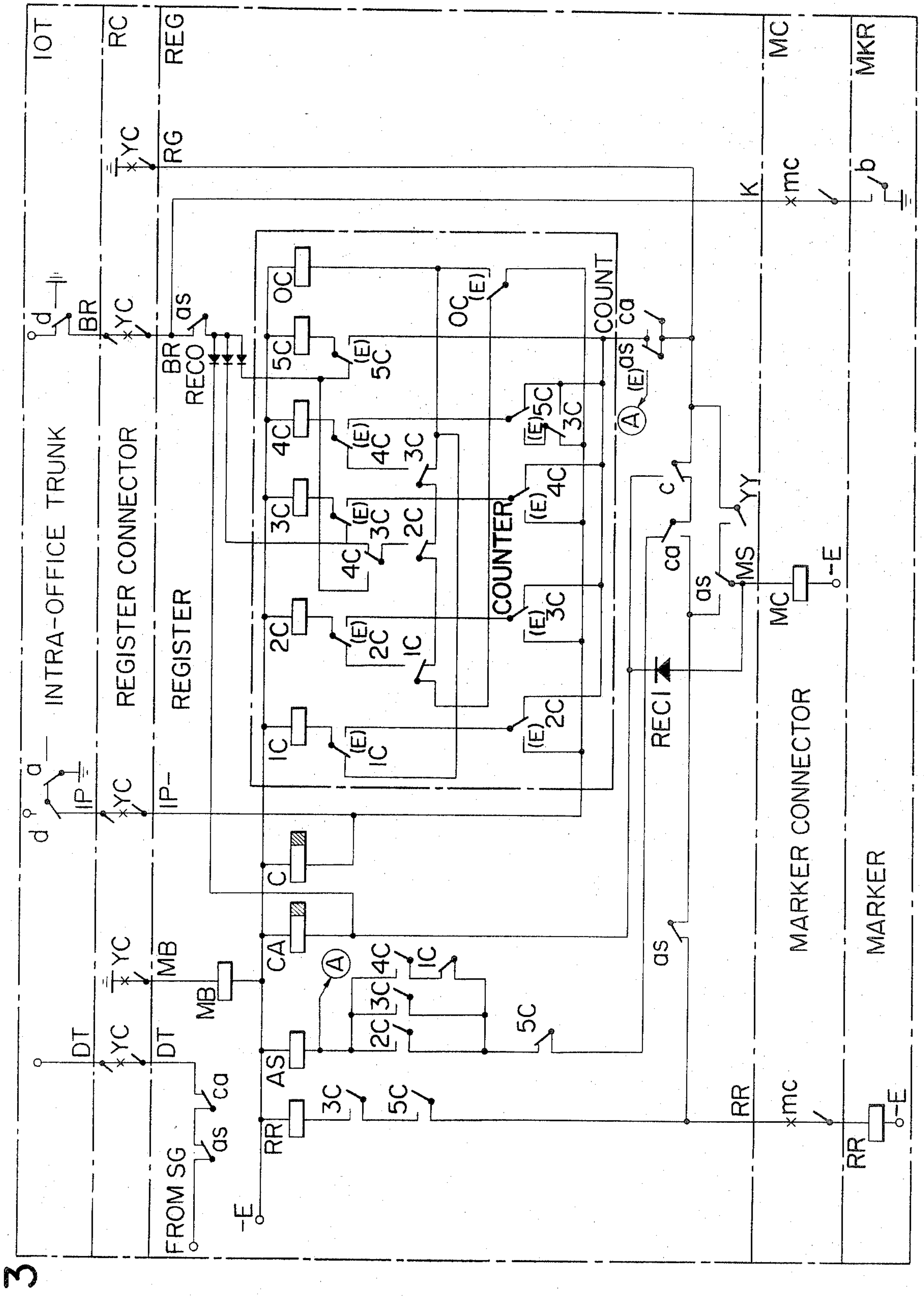
FIG. 3 is a circuit diagram illustrating details of portions of the components in FIG. 1.
Figure 4A:
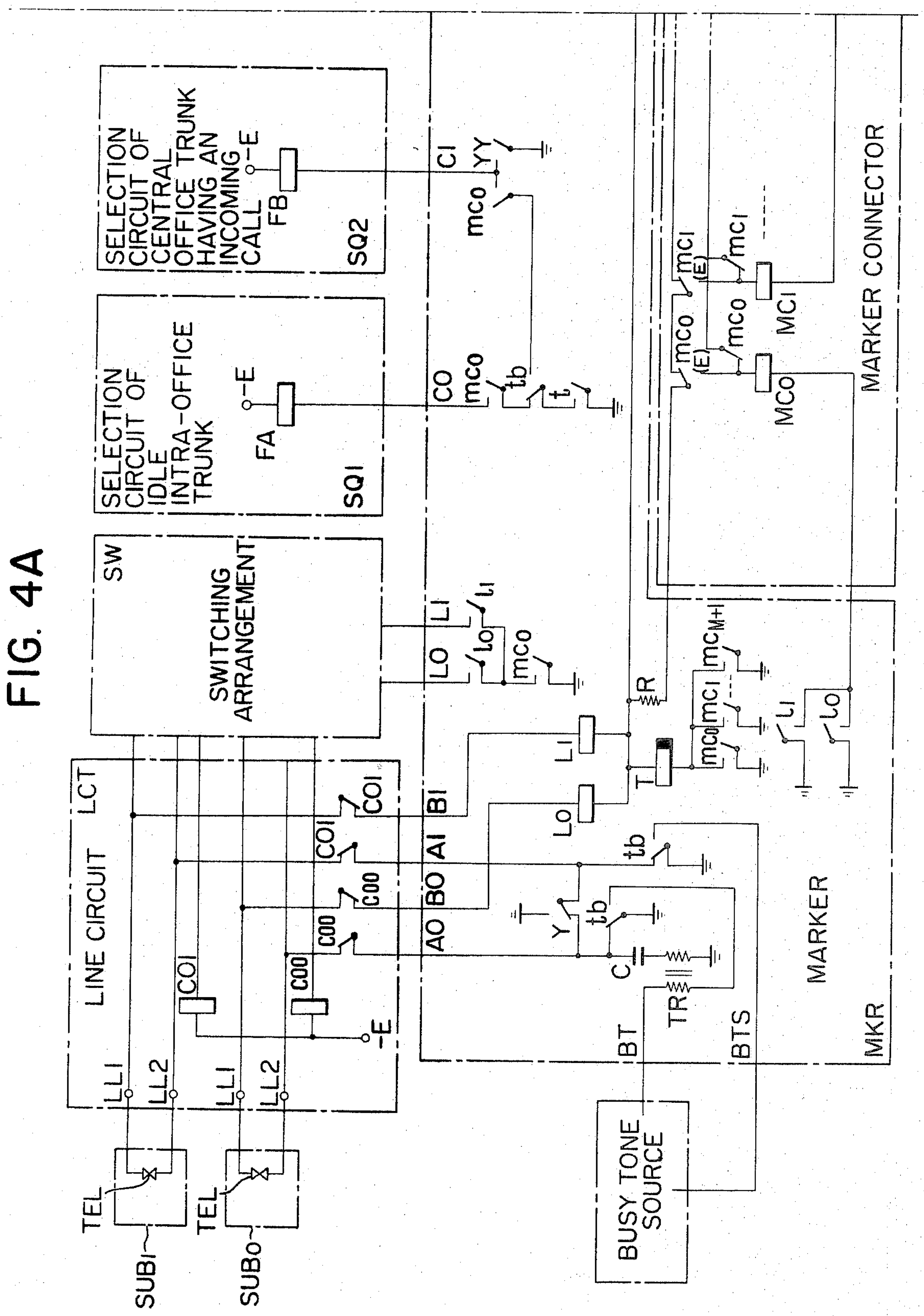
FIG. 4 is a circuit diagram illustrating details of the components in FIG. 1.
Figure 4B:
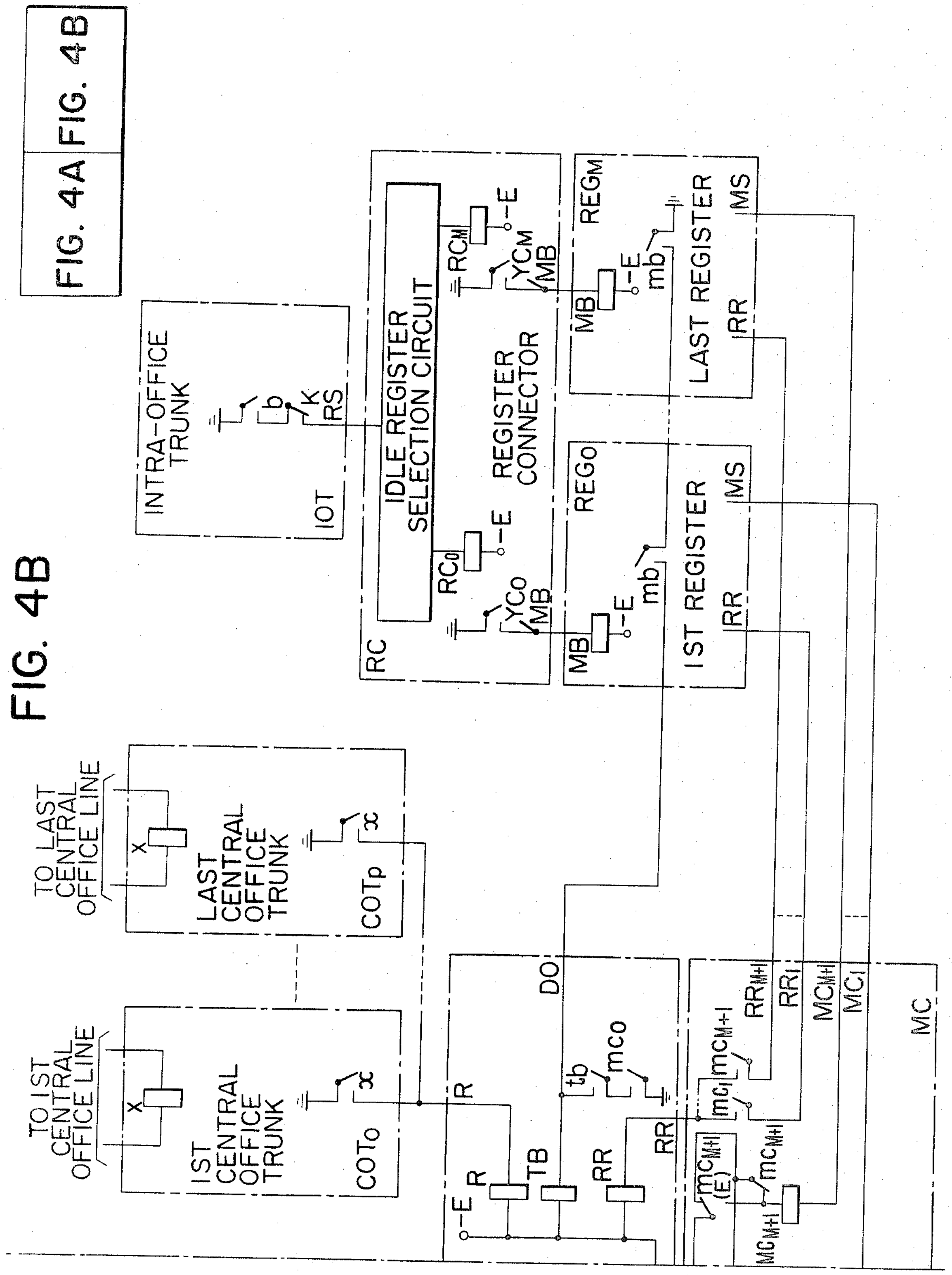
Figure 5A:
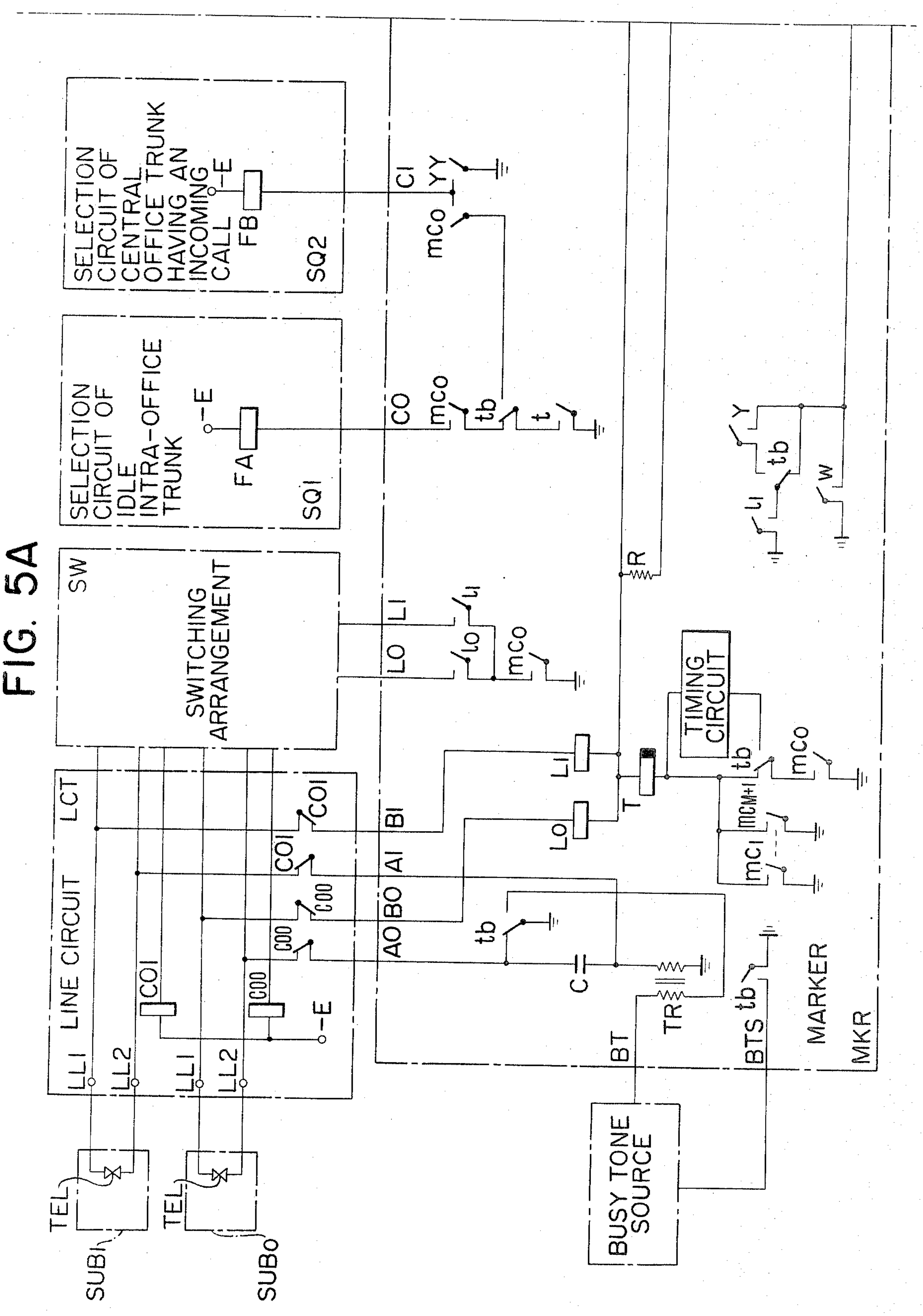
FIG. 5 is a circuit diagram illustrating details of the components in FIG. 1 which may be used as an alternative to the components in FIG. 4.
Figure 5B:
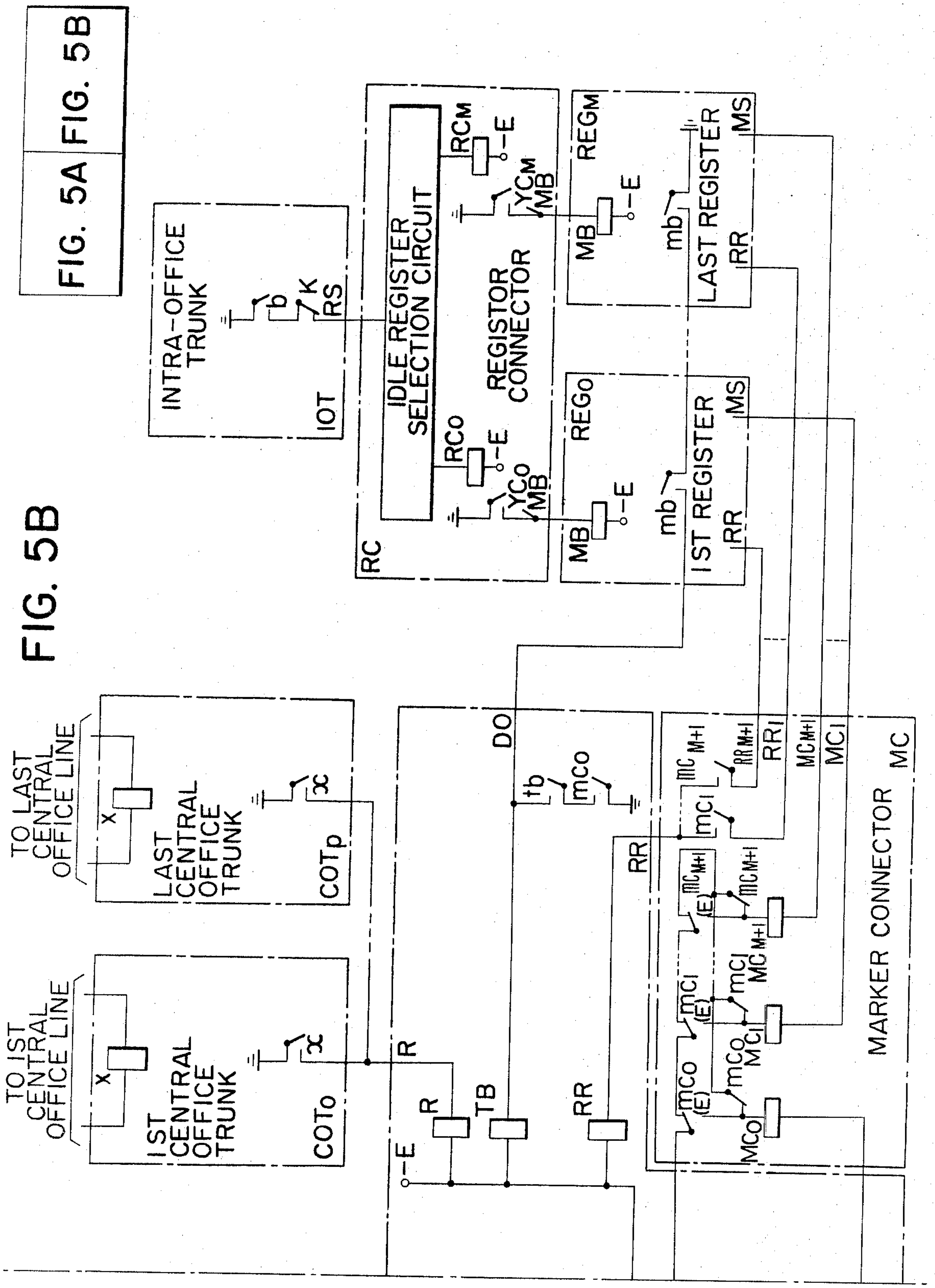

Details of the operation of the circuit in FIG. 1 are illustrated in FIGS. 2 and 3, and further details in FIGS. 4 and 5.

FIG. 3 to some extent duplicates parts shown in FIG. 2. Specifically, portions of the intra-office trunk and register connector appearing in FIG. 2 also are seen in FIG. 3. Thus, FIGS. 2 and 3 overlap. The connections between the intra-office trunk of FIG. 2 and the register of FIG. 3 are show in both figures. FIGS. 2 and 3 are connected to the remainder of the system as shown in FIGS. 1A and 1B.

FIGS. 2 and 3 illustrate an example of a so-called last register system wherein the register is seized through the register connector after the intra-office trunk is seized through the switching arrangement SW.

In FIG. 2 the reference characters correspond to the reference characters of FIG. 1. The subscriber station $SUB_0$ corresponds to the similarly marked station in FIG. 1. In both FIG. 1 and FIG. 2 the subscriber station includes the non-locking answer key RK, and the telephone circuit TEL.

Further, thetransfer contact in the relay contacts shown in FIG. 3 and in FIGS. 4 and 5 which will be explained later on, has a symbol (E) at the site of the off-normal contact which is opened at normal times. The symbol means that the off-normal contact denoted by (E) is defined so as so be necessarily closed before the on-normal contact which is closed at normal times has been opened when the relay is energized. In other words, this means that when the relay is energized, the "three point contact condition" occurs always. Such a contact is known by the name "early-make break contact."

The intra-office trunk IOT and register REG arranged in the detailed circuits shown in FIG. 2 and FIG. 3 refer respectively to one of the idle intra-office trunks and one of the idle registers selected by the above-mentioned process.

In FIGS. 2 and 3, going off-hook causes the circuit in the subscriber station $SUB_0$ to loop through the handset in the telephone TEL. It causes cross point contacts or cross bar contacts sw in the switching arrangement $sw_{00}$, which ultimately connects the station $SUB_0$ with the intra-office trunk IOT, to complete a connection from the negative terminal of a source −E through a relay A in the intra-office trunk IOT, through the telephone loop, back through the relay A, and to ground. The relay A is the communication current supply relay for the calling party. As relay A operates, its contact *a* energizes a slow releasing relay B which confirms seizing of the intra-office trunk IOT. The relay D is the communication current supply relay for the called party. It should be noted, that the contacts of all relays are represented by the small letters corresponding to the large letters which designate the coils.

A contact *b* of the relay B now closes to energize the cut-off relay CO and hold it since then in the portion of the line circuit LCT corresponding to the subscriber station $SUB_0$. The normally opened make contact co of the relay CO now closes. Each contact $sw_{00}$ shown closed when the phone went off-hook. A second contact *b* closes a path to the idle register selection circuit in the register connector RC. Then a relay RC corresponding to one of idle registers is selected in the register connector. The contacts rc of the relay RC now close. At this point the register REG and the intra-office trunk IOT are connected to each other through one of the contacts rc and the local subscriber $SUB_0$ hears a dial tone from a dial tone terminal DT through the winding of the relay A. As shown in FIG. 3, the dial tone terminal DT receives its dial tone signal from a dial tone source terminal SG.

When the subscriber dials the answering number "8," which is selected to answer incoming calls from the central office, the dial pulse contacts in the telephone TEL of the subscriber station $SUB_0$ in FIG. 2 open and close. The relay A operates intermittently in accordance with the number dialed through the switching arrangement SW. Grounded pulses from the intra-office trunk IOT pass to a dial pulse counter COUNT in the register REG (FIG. 3) through a terminal IP.

In FIG. 3, the counter COUNT counts the dial pulses with the following combination of relays. One dial pulse is counted with the relay 1C. Two dial pulses are connected with the relay 2C; three dial pulses with the relay 3C; four dial pulses with the relay 4C; five dial pulses with the relays 4C and 1C; six dial pulses with the relays 4C and 2C; seven dial pulses with the relays 5C and 2C. Eight dial pulses are counted with the relays 3C and 5C; nie dial pulses with the relay 5C; and ten dial pulses indicating the number zero with the relays 5C and 1C. A shifting relay OC operates when 1, 5 and 0 (equivalent to 10) are dialed. In FIG. 3, a relay AS determines the level of the dialing to establish intra-office connections and operates when the first figure of the dial number is 2 or 3 or 4, but does not operate when the figure is other than 2 or 3 or 4. A relay C and an auxiliary relay CA determine whether the dial pulses are continuing. A relay $MC_1$ in the marker connector MC serves as a marker connector relay and includes a contact $mc_1$. The marker MKR is the common control circuit. A relay RR in the marker receives the answer signal to the central office incoming call from the register REG. The contact carrying the lower case letters corresponding to the relays represent the contacts belonging to those relays.

When the number of pulses corresponding to the number "8," namely the number selected for answering, the relays 3C and 5C operate together and establish the condition for indicating that the count has been finished. When dialing is finished the ground connection at the dial answering terminal IP is broken. The relay C is then released. Within the slow release time of the relay CA, operation of relays 3C and 5C causes the contacts *3c* and *5c* to energize the relay RR in the register REG. The latter relay indicates the existence of an answer signal to the incoming call from the central office. Thus the register REG determines that the dialing constitutes the answer to the incoming call from the central office.

Operation of the relay RR closes the contact rr and energizes the relay $MC_1$ in the marker connector MC. This closes the contact $mc_1$ and energizes the relay RR in the marker MKR. Then the marker is now informed that the subscriber should be connected to the central office trunk.

The ground connection to the relay $MC_1$ in the marker connector MC follows either one of two paths. One path starts at a negative source −E passes through the relay $MC_1$, the contact as, the contact rr, through the contact rc to ground. The second path again passes through the relay $MC_1$, the contact as, a contact ca, a contact *c*, and the contact rc to ground.

The above two paths are never formed simultaneously. The first path is formed by excitation of the relays 3C and 5C to answer the incoming call from the central office. The second path is formed in response to excitation of the relay AS when the numbers "2," "3" and "4," are dialed respectively, as is the case for ordinary intra-office communication. The relay C and CA always latch when a train of pulses corresponding with each figure of a dial number is received from the terminal IP.

When a subscriber uses a key RK to answer an incoming call the system operates as follows. The subscriber station $SUB_O$ goes off-hook and the telephone set completes a circuit from the source –E (shown in the top righthand corner of FIG. 2) through the relay A, through the cross point switches $sw_{00}$ of the switching circuit SW, through the dial contact at the telephone set TEL in the station $SUB_O$, through a cross point switches $sw_{00}$ in the switching circuit sw, and through the relay A to ground. This operates the relay A and closes a contact a that energizes the relay B in the trunk IOT. A contact *b* in the trunk IOT energizes the idle register selection circuit in the register connector RC. And then a connection relay B also completes a circuit from the source –E through a relay D, whi,h is idle at that time, a contact *b*, a normally closed contact *k* of an idle test relay K for the called party, a cross point $sw_{00}$ through the terminal RK, and the normally open key RK through the contact CO which is already closed to ground.

When the key RK is operated by the subscriber $SUB_O$ in response to an incoming call, the relay D in the trunk IOT is energized. The contact d near the relay K then grounds a line passing through a terminal BR from the trunk IOT through the register connector to the register REG. That is, the terminal BR is the terminal of the button answer signal. On the other hand, a terminal K in the register REG receives idle information from the marker during an ordinary intra-office connection and applies it to terminal BR.

In effect, the operation of the relay D in the trunk IOT informs the trunk that the incoming call from the central office is being answered with the key RK. Grounding at the terminal BR energizes a relay CA in the register (FIG. 3) through one of the diodes RECO and the relays 3C and 5C through two other diodes RECO.

The operation of relays 3C and 5C closes the contacts 3*c* and 5*c* in series with the relay RR and energizes the latter relay. This corresponds precisely to what is accomplished by dialing "8." Thus the relay $MC_1$ is energized through the now closed contact rr. Operation of the relay RR energizes the relay $MC_1$ through the contacts rr and then the relay RR in the marker operates. The relay $MC_1$ in the marker connector causes the register REG to engage the marker MKR through the now closed contact $mc_1$. The marker MKR is thus informed that the subscriber should be connected with the incoming call from the central office.

Thus, whether the subscriber dials or uses the answering key, the response depends on the operation of relays CA and 3C, 5C, at the count circuit COUNT in the register REG.

Whether the subscriber uses a dial signal or a key signal to answer the incoming call from the central office, both signals ultimately actuate the relay RR in the register REG and the relay RR in the marker MKR. The marker MKR operates in the same manner in response to a key answer signal and a dial answer signal to determine that the subscriber is to be connected to a central office incoming call. Thus the marker can proceed as if a dial signal had been received.

A rectifier REG in FIG. 2 inhibits misoperation of the exchange due to ground applied to the circuit of the called party during key answering.

In the examples of FIGS. 2 and 3, at the dial tone connection it is available to the called party branch of the intra-office trunk is idle. Thus, answer by the key signal is transferred by means of the incoming call answering confirming relay.

Similar provisions can be made for connection circuits or switching circuits having input and output connecting functions. As shown, the answer signal from the intra-office trunk is sensed by the operation of the relay CA and 3C, 5C, at the counter COUNT in the register REG whether dialing or key answering is used.

In the usual intra-office interconnection, when the first figure of the number of a subscriber to be called, (the figure is one of 2, 3 and 4) has been dialed, the count circuit COUNT of a register REG counts the figure and then transfers it to another place in which the figure is memorized. After that, the register is reset to prepare itself for the count of the second figure. On the other hand, when the first figure has been dialed, the relay C is released and then relay AS is released, and relay AS is actuated and maintained at the actuated state. Therefore, when the count circuit COUNT has counted the dialed second figure of the called subscriber's number, the relay RR of the register REG and relay RR of the marker MKT are not actuated, because the contact as is opened by the actuation of the relay AS, breaking the actuating lines of them. Therefore, even if the second figure of the number of the subscriber to be called is "8," the figure is not mistaken for the answering signal assigned to the central office incoming call. Moreover, there is produced the timing such that relay C is released when the second figure of the subscriber's number has been dialed, but the relay CA is not released yet, because the relay CA has a slow releasing characteristic as original property, so that contact *c*, contact ca and contact as are connected in series, and the relay $MC_1$ of the marker connector MC is actuated by the grounded battery passing through contact rc and register connector RC, and at the same time the grounded battery passing through the contact as is branched and given to relay CA through diode $REC_1$ so that the relay CA is not released.

In this case, the relay $MC_1$ actuated in the marker connector MC actuates the marker, which can be understood from the detailed circuit diagrams shown in FIG. 5 and FIG. 4.

In the above-mentioned example of the intra-office interconnection, the first figure of two digit numbers of the intra-office subscribers is one of 2, 3, and 4, and the second figure may be one of 1, . . . , 9 and 0 (equal to 10). In practice, the second figure is designed so as to be one of 1 – 9). However, the number of figures of the subscriber's number is not limited in general.

In the usual case, it is only required that when the first figure of the number has been counted, the relay AS is actuated and maintained at this actuated state, and that when the last figure of the number has been counted, the marker connector MC is actuated. In the circuit shown in FIG. 3, the relay $MC_1$ is so designed as to be actuated when the completion of counting the last figure of the subscriber's number for the intra-office interconnection has been detected by that the relay CA is not released.

In the register the relay RR determines the existence of an answer to the incoming call from the central office, whether dial answering or key answering is used. The relay delievers an order to the marker. Since the operation using the key to answer or the dial to answer results in the same relay actuation there is no need to distinguish dial answering from key answering in spite of the fact that two systems can be used.

Although the dial tone is delivered from the register through the intra-office trunk IOT, that is the mutual communication connection circuit, the operator need merely confirm whether the connection has proceeded to the stage at which dialing can proceed, either because of the existence of a dial tone or other dialing permission. This is so regardless of the source of the dial tone.

FIGS. 4 and 5 illustrate the operation of the system in case of marker MKR is triggered after the register has finished its doings and when all registers are busy.

In order to illustrate this bent, FIGS. 4 and 5 show two telephone subscriber stations $SUB_O$ and $SUB_1$ connected to the switching arrangement SW.

In FIG. 4 a relay X responds to an incoming call from the central office. RElays $RC_O$ – $RC_M$ in the register connector RC operates with the relay B in the respective intra-office trunk. A relay MB in each register determines whether the register REG is busy. A relay TB in the marker MKR operates when ground is applied to a terminal DO indicating that the none of registers can be seized, namely because the relays MB in the register $REG_O$ – $REG_M$ are in operation. The relay RR in the marker MKR operates when ground is applied to the terminals $RR_1$ – $RR_{M+L}$ by means of the signal from the respective register when the answer to the incoming call from the central office is detected by the subscriber's dial in the respective register $REG_O$ – $REG_M$. A terminal BT applies a busy tone to an induction coil TR. Respective cut-off relays $CO_O$ and $CO_1$ are supplied for each of the telephones in the subscriber station $SUB_O$ and $SUB_1$. The latter include terminals $LL_1$ and $LL_2$ as well as respective call signal detect relays $L_O$ and $L_1$.

A relay $MC_O$ serves to check the control device, namely the marker MKR at the dial tone connection, and the relay $MC_1$ – $MC_{M+1}$ connects the register $REG_O$ – $REG_M$ with the control device or the said marker. A timer relay T has a delayed response due to the operation of the relays $MC_O$ and $MC_1$ – $MC_{M+1}$. A relay R responds to ground applied to the terminal R when an unanswered incoming call from the central office operates the relay X in the central office trunk COT.

A circuit $SQ_1$ serves as a selection circuit in the intra-office trunk $IOT_O$ – $IOT_K$. In the circuit $SQ_1$ a relay FA carries out the selection of an idle intra-office trunk and is operated by a ground applied at the terminal CO when the handset is raised. A circuit $SQ_2$ is the selection circuit of the central office trunks $COT_O$ – $COT_P$. A relay FB delects the central office trunk generating the incoming call. It is operated by ground applied to the terminal $C_1$ by means of information from the register. A terminal BTS excites the busy tone circuit.

In a manner similar to that shown in FIG. 1, there is shown one intra-office trunk IOT selected from the ($K$ + 1) intra-office trunks from the $IOT_O$ to $IOT_K$. The detailed circuit diagram necessary for explaining the present invention are the same as that shown in FIG. 2. When a subscriber goes off-hook, one idle intra-office trunk is selected from among $IOT_O$ to $IOT_K$ by the marker MKR. Therefore, FIG. 4 should be understood in such a way that the IOT refer to the selected one.

The first register $REG_O$ and the last register $REG_M$ among the ($M$ + 1) registers are shown in a manner similar to that shown in FIG. 1. In the register connector, there are shown a relay $RC_O$ corresponding to the register $REG_O$ and relay $RE_M$ corresponding to the register $REG_M$. Therefore, the $RC_O$, for example, should be understood in such a way that when the $REG_O$ which has been found out as an idle register is connected to IOT, the $RC_O$ is made operative.

In the marker connector, there are provided relays corresponding to their respective registers. The relays actuate the marker and connect their respective registers $REG_O$ – $REG_M$ to the marker. In the figure, the register $REG_O$ is shown in such a manner as to correspond to a relay $MC_1$, and likewise the $REG_M$ to a relay $MC_{M+1}$.

The contact rc within the register connector shown in FIGS. 2 and 3, and the relay $MC_1$ and its contact $mc_1$ within the marker connector MC shown in FIG. 3 are one of such several relays RC and one of such several relays MC and contacts thereof.

The relay $MC_O$ which is made operative when a subscriber goes hook-off does not operate together with relays from $MC_1$ to $MC_{M+1}$.

TELs within $SUB_O$ and $SUB_1$ are shown in the meaning of the their dial contacts. Two lines extending from the dial contact to the switching arrangement SW refer only to the paired communication lines among three or four leads extending from a subscriber's telephone shown in the FIG. 1. The lead extending from the key of $SUB_O$ are not shown in FIG. 4.

The circuit in FIG. 4 operates as follows, with the register REG, ex. $REG_O$, idle. When the telephone in either station $SUB_1$ or $SUB_0$ goes off-hook a current path is completed from a source –E near the relay R through the relay $L_0$ or $L_1$, through the cut-off contact $co_0$ or $co_1$, through whichever of the two telephones is off-hook, through second contacts $co_0$ or $co_1$, and through the contact tb to ground. This operates either one of the relays $L_0$ or $L_1$ and identifies which one of the subscribers is off-hook. Contact $1_0$ or $1_1$ then energizes a relay $MC_O$ whose contact $mc_O$ operates relay T. Operation of the relays T and $MC_O$ closes contact $mc_O$ and t in series with a terminal CO. This energizes relay FA in selection circuit $SQ_1$ in the intra-office trunk IOT. The operation of the relay FA carries out the selection of one of the idle intra-office trunk in response to the ground applied to the terminal CO when the handset is raised.

When the answering number "8" is dialed, the answering information for the incoming call from the central office is passed to the register REG, ex. $REG_O$, which, on the basis of the information, applies a ground to the terminal $MC_1$. This energizes relay $MC_1$ whose contact $mc_1$ energizes the relay RR. This allows the register $REG_O$ to apply ground to the relay RR and energize the latter.

Energization of the relay RR in the marker MKR closes a contact rr that closes a current path through a relay FB in a selection circuit $SQ_2$ of the central office trunk COT. The relay FB carries out the selection of the central office trunk generating the incoming call and operates in response to the ground being applied to the terminal $C_1$ on the basis of information from the register.

If the handset is raised when none of registers is idle, the terminal DO is connected to ground through each contact mb in the respective register $REG_O$ – $REG_M$. The relay TB then operates. The contact tb then disconnects ground from each terminal $LL_2$ of $SUB_0$ and $SUB_1$, and the busy time is excited. The handset is then raised. Whether it is raised on station $SUB_0$ or $SUB_1$, relay $L_0$ or $L_1$ remains unchanged. The subscriber can then not complete the dial tone connection. He does not hear the dial tone, instead he only hears the busy tone. A contact *r* of the relay R operates in response to ground applied to the terminal R in the presence of an unanswered incoming call from the central office indicated by the relay X. Then, grounded battery is supplied to $LL_1$ terminal of $SUB_1$ by the contact *r*.

If an unanswered call from the central office exists when the $SUB_1$ can seize none of registers, the ground follows a route through the contact *r*, through the contact $co_1$, through the terminal $LL_2$, through the telephone loop TEL, the terminal $LL_1$, the contact $co_1$, and the relay $L_1$ to the source –E. As a result the relay $L_1$ is grounded. This constitutes detection of the originating calling signal and the position of the subscriber station whose handset has been raised, namely the subscriber station $SUB_1$. The relays $MC_O$ and T then operate as mentioned above and establish a path from ground, through the contact *t*, the contact tb, the contact $mc_O$, to the terminal $C_1$. This results in discrimination and selection of the path of the incoming call from the central office. The answering telephone $SUB_1$ is connected to the path of the incoming call from the central office and the telephone $SUB_1$ may be answered.

If, in this case the answering party is one subscriber set $SUB_O$, ground cannot be obtained even through the contact *r* either contact tb. Thus, no calling selection can be carried out so that the incoming call from the central office cannot be answered.

The circuit in FIG. 5 has the same purpose as the one in FIG. 4. Here the relays $MC_O$, $MC_1$ – $MC_{M+1}$, and T operate the same as in FIG. 4, and like parts are designated with like reference characters.

In FIG. 5, under the condition of the relay TB is actuated the station $SUB_0$ or $SUB_1$ calls and none of the registers can be seized. Thus, even if the relay $L_1$ operates, the relay $MC_O$ does not pull in so that no request for the selection of a line is established. However, the subscriber who raises the handset can hear a busy tone.

However, an unanswered incoming call from the central office causes the contact *r* to close. Thus if the calling or answering party is on the station $SUB_1$, the relay $MC_O$ operates. After the subscriber on station $SUB_1$ listens to the busy tone for a time predetermined by the timing circuit, the incoming call from the central office is effectively answered.

If the answering or calling party is at station $SUB_O$ the incoming call from the central office cannot be answered. As in FIG. 4, a subscriber at either station $SUB_0$ or $SUB_1$ can carry out the selection of a path from the terminal CO during ordinary off-hook dialing.

While the service classes for the stations $SUB_0$ and $SUB_1$ are explained as being different from each other, this difference is minimal with regard to the present invention.

Both of the system of FIG. 4 and the system of FIG. 5 are in conformity with the block diagram of FIG. 1, and the detailed circuit diagrams of FIGS. 2 and 3 are in conformity with either of the systems of FIGS. 4 and 5. Therefore, a designer may select freely either of the systems of FIGS. 4 and 5 for his design.

In FIGS. 1 to 5 any kind of key can be used. According to one embodiment of the invention, the linked electric key of an exclusive non-locking system or a partial locking system is used. According to still another embodiment of the invention, the electric key of a locking system is utilized. The lock is released by means of an electromagnetic mechanism when the register detects an incoming call from the central office. Any suitable key, contrasted with the dial operation can be utilized.

The above-mentioned explanation is given to the case of the answering to the incoming call using an exchanger of the so-called register postposition system.

In general, in the case of the exchanger of the register postposition system, a route for transmitting informations is formed from a telephone to a register through an intra-office trunk, and necessary informations which are to be given from the telephone to the register are transmitted by the route.

In the case of the exchanger concerned with the present invention, the intra-office trunks are used as connection trunk means for the intra-office intercommunication, as intermediate means of an information transmitting route formed when telephones seizes a register and said register counts the answering information given by the telephone, and as circuit means for making an intermediate part on the process of connections of a series necessary for connecting a telephone to a central office trunk. Among said three cases, the above-mentioned explanation which so far been made according to FIGS. 1–5 corresponds mainly to the case wherein a telephone seizes a register and said register counts the figures of the number, and to the case wherein said telephone is, in the next place, connected to a central office trunk to answer the incoming call, further to the exceptional case wherein when any register cannot be seized because all of the registers are busy, the telephone is connected to a central office trunk carrying the incoming call without the aid of any intra-office trunk and register.

However, the present invention has not its indispensable requirements within the condition that the register must be seized by a route parring through the intra-office trunk, that is, the exchanger of the register postposition system must be used. So far as an off-hooked telephone can seizes any register, its route may be selected unrestrictedly. Therefore, the present invention can be applied to a system (an exchanger of the register juxtaposition system, or of the register preposition system) in which a calling telephone is connected to a register as soon as it is connected to a switching arrangement.

Conventionally, a telephone having an electric key for answering the incoming call requires a specially provided route through which the answering signal generated by operating the key is transmitted to a register. Moreover, it requires a tedious special operation in such a manner that the off-hook must be carried out after the key has been operated. But in the present invention, the answering signal as generated by the key is transmitted through the same route as that of the answering signal generated by the dial, so that the exchanger is advantageously utilized in constructing the circuit arrangement and controlling the mechanism. Further, the key may be operated after the hook-off has been carried out, this operation being commonly used for the operation of the usual telephones so that there is advantageously no troule in the operation.

As a general point it should be noted that PBX, which is abridgement of Prive Branch Exchange is a general term for an exchange and its accessory equipments and installations which are used to establish telephone calls between outside sections and inside sections of a government office, companies, factories, banks, offices, hospitals, hotels, etc., or mutually inside sections of these facilities, and the main part of the above-mentioned equipments is the exchange. That is to say, the exchange is an apparatus to exchange and connect the communication routes, through connecting devices such as a connecting trunk, a key (or button), switching devices, etc., between an external line (or Central Office Line including Exclusive Line) and an internal line of free choice or between internal lines of free choice. Even if one office line and an internal line are busy, or an exchanging operator and an office line or an internal line are busy, it is possible to connect between internal lines mutually.

When classifying PBXs on the basis of operating principle, there are a manual type and an automatic type, and the automatic type is called PABX, namely Private Automatical Branch Exchange. In many PABX methods, when the communication route between the outside section and the inside section is formed, such as from the outside to the inside or from the inside to the outside, it is necessary that the exchanging operator should perform the prescribed connecting operation. One of the methods to meet this requirement is Station Answering (or Call Transfer Individual Method) and the privide exchange of this method is called Station Answering Private Automatical Branch Exchange.

One of the important features of the function of the Station Answering Private Automatic Branch Exchange is that it is possible to perform a transfer connection (or change-over connection) of the incoming call of the external line to other telephones of the internal line according to the prescribed operation, using some specified ones of the telephones of internal lines, or using all of the telephones of the internal lines in case of a certain system of the exchange.

Thp answering operation to the incoming call of the external line and the transfer connection operators are related to the case when the above-mentioned operations are performed by one of the examples of Station Answering Private Automatic Branch Exchange which contains these functions.

While embodiments of the invention have been described in detail it will be obvious to those skilled in the art that the invention may be embodied otherwise without departing from its spirit and scope.

What is claimed is:

1. A private branch telephone exchange, comprising a plurality of subscriber stations, a plurality of trunks, a plurality of registers, switching means for establishing connections between said subscriber stations and said trunks, marker means responsive to said subscriber stations for connecting said registers to said trunks and responsive to said registers for establishing the connections between said subscriber stations and said trunks, said registers being capable of being idle or in use, control means in said marker means responsive to all of said registers being busy and to the existence of an incoming call on one of said trunks and to a subscriber station being answered by a subscriber for connecting the one of said subscriber stations being answered by a subscribpr to the trunk carrying the incoming call.

2. A private branch telephone exchange, comprising a plurality of stations, a plurality of intra-office trunks, a plurality of registers, a marker, a switching arrangement, a plurality of marker connectors, a plurality of register connectors, a plurality of central office trunks, said switching arrangement being connected with said station as well as said central office trunks and said intra-office trunks, said switching arrangement having means responsive to the station for connecting said station with an intra-office trunk or a central office trunk by control of the marker, each of said stations having dial means and at least one of said stations having one key which replies to one trunk in which an arriving call exists, each of said registers being connected with an intra-office trunk through a register connector and connected with a marker through a marker connector, each of said stations having means responsive to said dial means for responding to an incoming call at the central office trunk through the switching arrangement by dialing a subscribed number, said switching arrangement having means for responding to operation of the key at the station with the key to connect an incoming call at a central office trunk to the station with the key, said station with the key having means for seizing a register through the switching arrangement and the intra-office trunk and the register connector by going off-hook, said key producing a DC current when operated, a transmitting line for transmitting key information and seizing the intra-office trunk of the station, the DC current produced by the key operation of the station with the key being transmitted to the intra-office trunk through the transmitting line and to the register seized by the station through a register connector, said seized register containing circuit means for counting and accumulating dial pulses dialed at the station so that the register can respond to a predetermined number, said seized register including circuit means for responding to the key operation as to the dialing of the predetermined number, said marker responding to the dialling of the predetermined number or operation of the key and having means for changing the connection of the station with the key from an intra-office trunk to the central office trunk which has an arriving call.

3. A private branch telephone exchange, comprising a plurality of stations, a plurality of intra-office trunks, a plurality of registers, a marker, a switching arrangement, a plurality of marker connectors, a plurality of register connectors, a plurality of central office trunks, said switching arrangement being connected with said station as well as said central office trunks and said intra-office trunks, said switching arrangement having means responsive to the station for connecting said station with an intra-office trunk or a central office trunk by control of the marker, each of said stations having dial means and at least one of said stations having one key which replies to one trunk in which an arriving call exists, each of said registers being connected with an intra-office trunk through a register connector and connected with a marker through a marker connector, each of said stations having means responsive to said dial means for responding to an incoming call at the central office trunk through the switching arrangement by dialing a subscribed number, said switching arrangement having means for responding to operation of the key at the station with the key to connect an incoming call at a central office trunk to the station with the key, said station with the key having means for seizing a register through the switching arrangement and the intra-office trunk and the register connector by going off-hook, said key producing a DC current when operated, a transmitting line for transmitting key information and seizing the intra-office trunk of the station, the DC current produced by the key operation of the station being transmitted to the intra-office trunk through the transmitting line and to the register seized by the station through a register connector, said seized register containing circuit means for counting and accumulating dial pulses dialed at the station so that the register can respond to a predetermined number, said seized register including circuit means for responding to the key operation as to the dialing of the predetermined number, said marker responding to the dialing of the predetermined number or operation of the key and having means for changing the connection of the station with the key from an intra-office trunk to the central office trunk which has an arriving call, said marker including means for detecting that all the registers are busy, means for detecting an arriving call at at least one of the trunks, circuit means for selecting a trunk containing an arriving call according to a predetermined order of priority, said circuit means controlling said switching arrangement and connecting the station with said key to said trunk, said circuit means responding to the arriving call when one of the stations containing the key is off-hook while said means for detecting that all of said registers are busy and said means for detecting an arriving call are in operation.

4. A private branch telephone exchange, comprising a plurality of stations, a plurality of intra-office trunks, a plurality of registers, a marker, a switching arrangement, a plurality of marker connectors, a plurality of register connectors, a plurality of central office trunks, said switching arrangement being connected with said station as well as said central office trunks and said intra-office trunks, said switching arrangement having means responsive to the station for connecting said station with an intra-office trunk or a central office trunk by control of the marker, each of said stations having dial means and at least one of said stations having one key which replies to one trunk in which an arriving call exists, each of said registers being connected with an intra-office trunk through a register connector and connected with a marker through a marker connector, each of said stations having means responsive to said dial means for responding to an incoming call at the central office trunk through the switching arrangement by dialing a subscribed number, said switching arrangement having means for responding to operation of the key at the station with the key to connect an incoming call at a central office trunk to the station with a key, said station with the key having means for seizing a register through the switching arrangement and the intra-office trunk and the register connector by going off-hook, said key producing a DC current when operated, a transmitting line for transmitting key information and seizing the intra-office trunk of the station, the DC current produced by the key operation of the station with the key being transmitted to the intra-office trunk through the transmitting line and to the register seized by the station through a register connector, said seized register containing circuit means for counting and accumulating dial pulses dialed at the station so that the register can respond to a predetermined number, said seized register including circuit means for responding to the key operation as to the dialing of the predetermined number, said marker responding to the dialing of the predetermined number or operation of the key and having means for changing the connection of the station with the key from an intra-office trunk to the central office trunk which has an arriving call, said marker including first detecting means for detecting that all of the registers are busy, second detecting means for detecting that an arriving call exists in at least one of said central office trunks, circuit means for producing an indicating tone to the station with the key for a predetermined time and selecting one of the trunks containing an arriving call according to a prescribed order of priority after the predetermined time, said circuit means controlling said switching arrangement for connecting said station with said trunk and responding to the arriving call when the station with the key is off-hook while said first detecting means and said second detecting means are in operation.

* * * * *